United States Patent
Sudhues et al.

(10) Patent No.: US 12,520,761 B2
(45) Date of Patent: Jan. 13, 2026

(54) CUTTING UNIT HAVING MOVABLE SIDEWALLS

(71) Applicant: Carl Geringhoff GmbH & Co. KG, Ahlen (DE)

(72) Inventors: Steffen Sudhues, Ahlen (DE); Michael Pokriefke, Hude (DE)

(73) Assignee: Carl Geringhoff GmbH & Co. KG, Ahlen (DE)

( * ) Notice: Subject to any disclaimer, the term of this patent is extended or adjusted under 35 U.S.C. 154(b) by 930 days.

(21) Appl. No.: 17/767,932

(22) PCT Filed: Oct. 6, 2020

(86) PCT No.: PCT/EP2020/077911
§ 371 (c)(1),
(2) Date: Sep. 13, 2022

(87) PCT Pub. No.: WO2021/069398
PCT Pub. Date: Apr. 15, 2021

(65) Prior Publication Data
US 2024/0099193 A1  Mar. 28, 2024

(51) Int. Cl.
*A01D 41/14* (2006.01)
*A01D 61/00* (2006.01)

(52) U.S. Cl.
CPC ......... *A01D 41/144* (2013.01); *A01D 61/002* (2013.01)

(58) Field of Classification Search
CPC ...... A01D 41/14; A01D 41/144; A01D 57/20; A01D 61/002
See application file for complete search history.

(56) References Cited

U.S. PATENT DOCUMENTS

| | | | | |
|---|---|---|---|---|
| 3,813,859 | A * | 6/1974 | Fuller | A01D 34/14 56/158 |
| 4,910,946 | A * | 3/1990 | Underwood | A01D 34/30 56/14.4 |
| 2004/0187461 | A1* | 9/2004 | Rickert | A01D 69/00 56/80 |
| 2006/0075734 | A1* | 4/2006 | Buermann | A01D 41/14 56/257 |
| 2015/0373907 | A1* | 12/2015 | Schulze Rückamp | A01D 41/06 56/246 |
| 2018/0206406 | A1* | 7/2018 | Joyce | A01D 61/002 |
| 2019/0000015 | A1 | 1/2019 | Lauwers et al. | |
| 2022/0071090 | A1* | 3/2022 | Kemmerer | A01D 57/04 |

FOREIGN PATENT DOCUMENTS

DE  10 2011 116 341  3/2013
EP  2 710 880  3/2014

* cited by examiner

*Primary Examiner* — Joseph M Rocca
*Assistant Examiner* — Julia C Tran
(74) *Attorney, Agent, or Firm* — Gudrun E. Huckett

(57) ABSTRACT

The present invention relates to a cutting unit (2) for attachment to a harvester. In order to reduce the size of the clearances at the outer ends of the conveying elements in which, depending on the pivoting position of the frame elements relative to each other, the conveying elements are ineffective, the sidewalls (14) are designed to be movable transversely to the working direction (A) of the cutting unit (2) and relative to the frame (22) or the respective associated frame elements (24*a*, 24*c*).

13 Claims, 9 Drawing Sheets

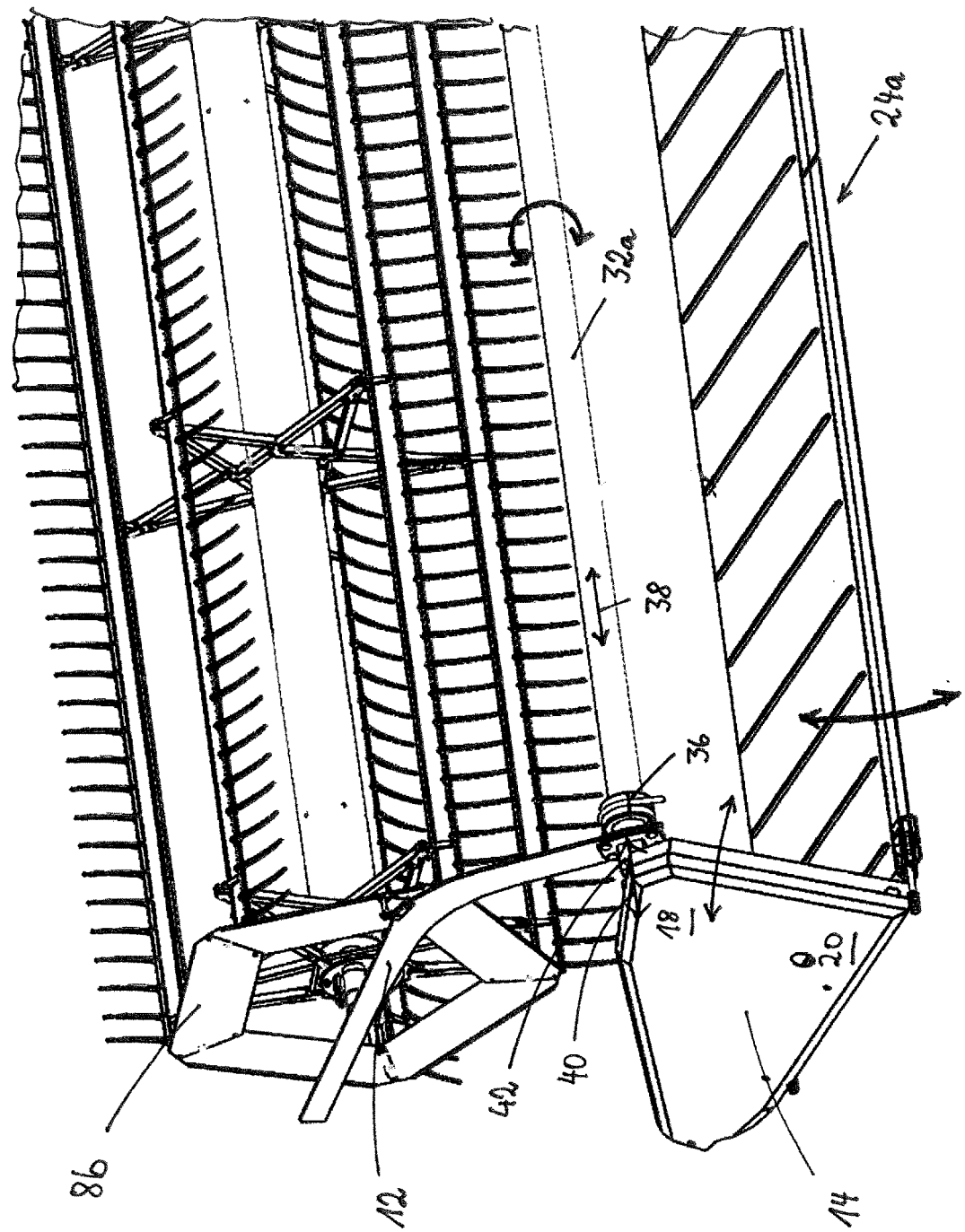

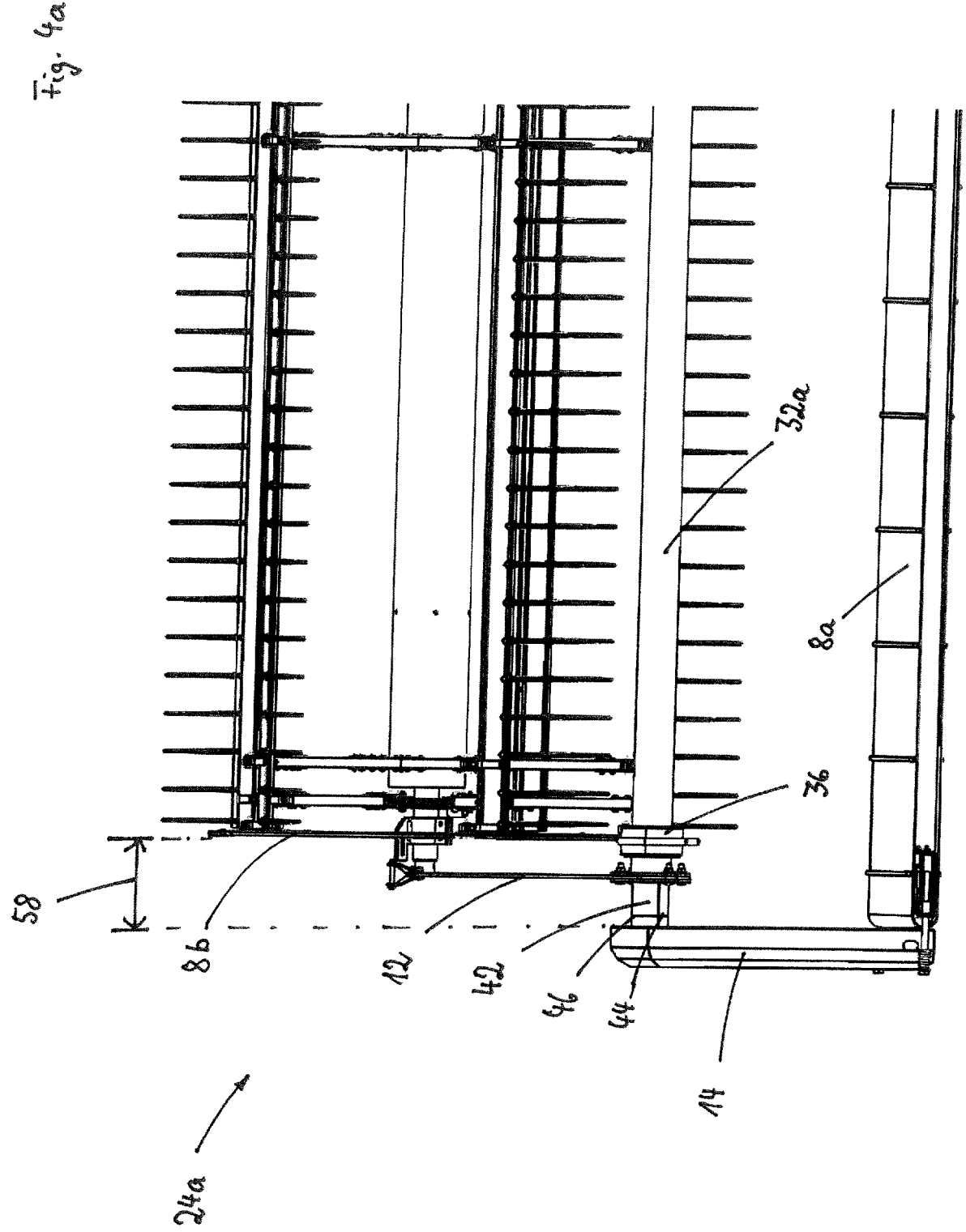

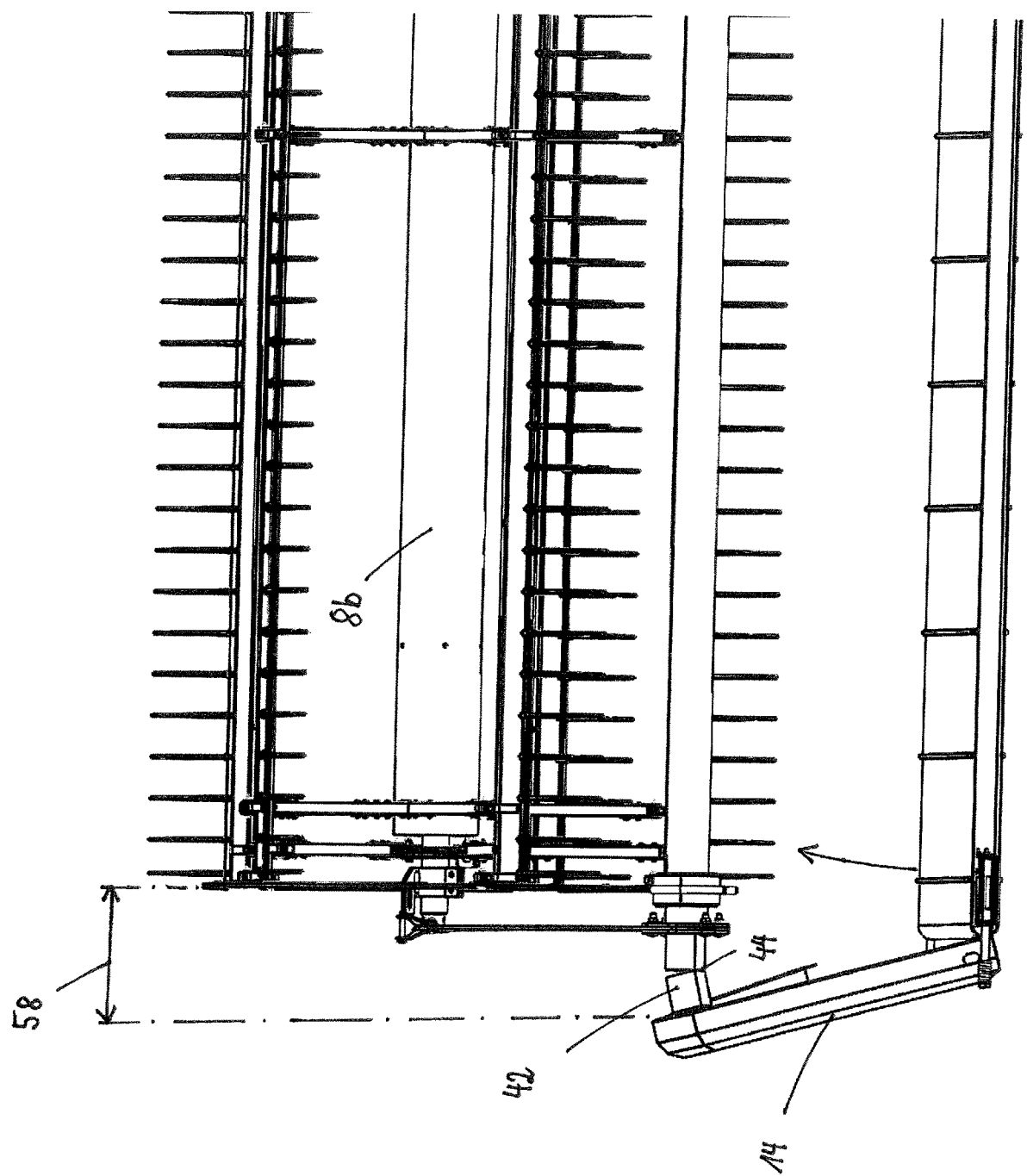

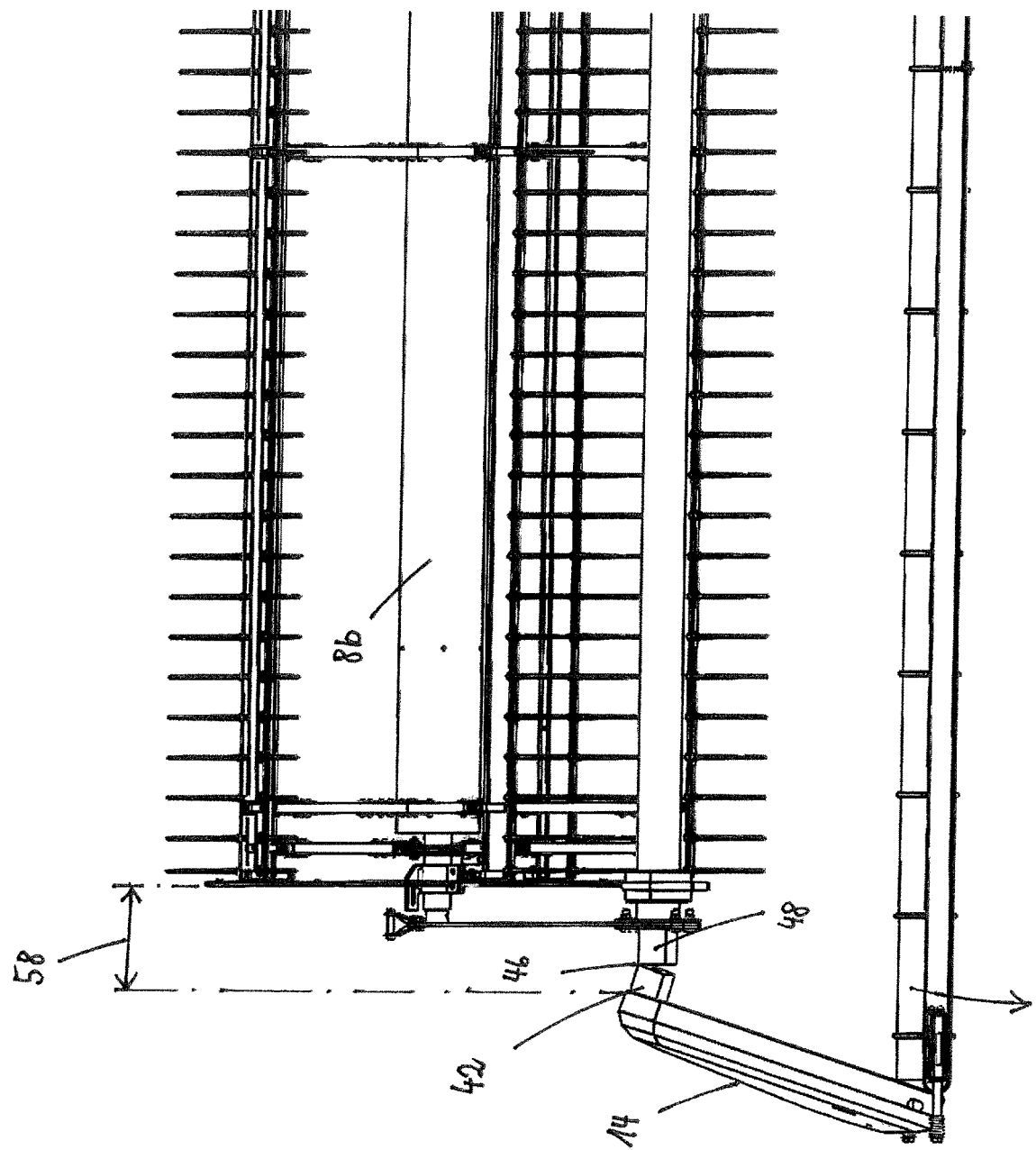

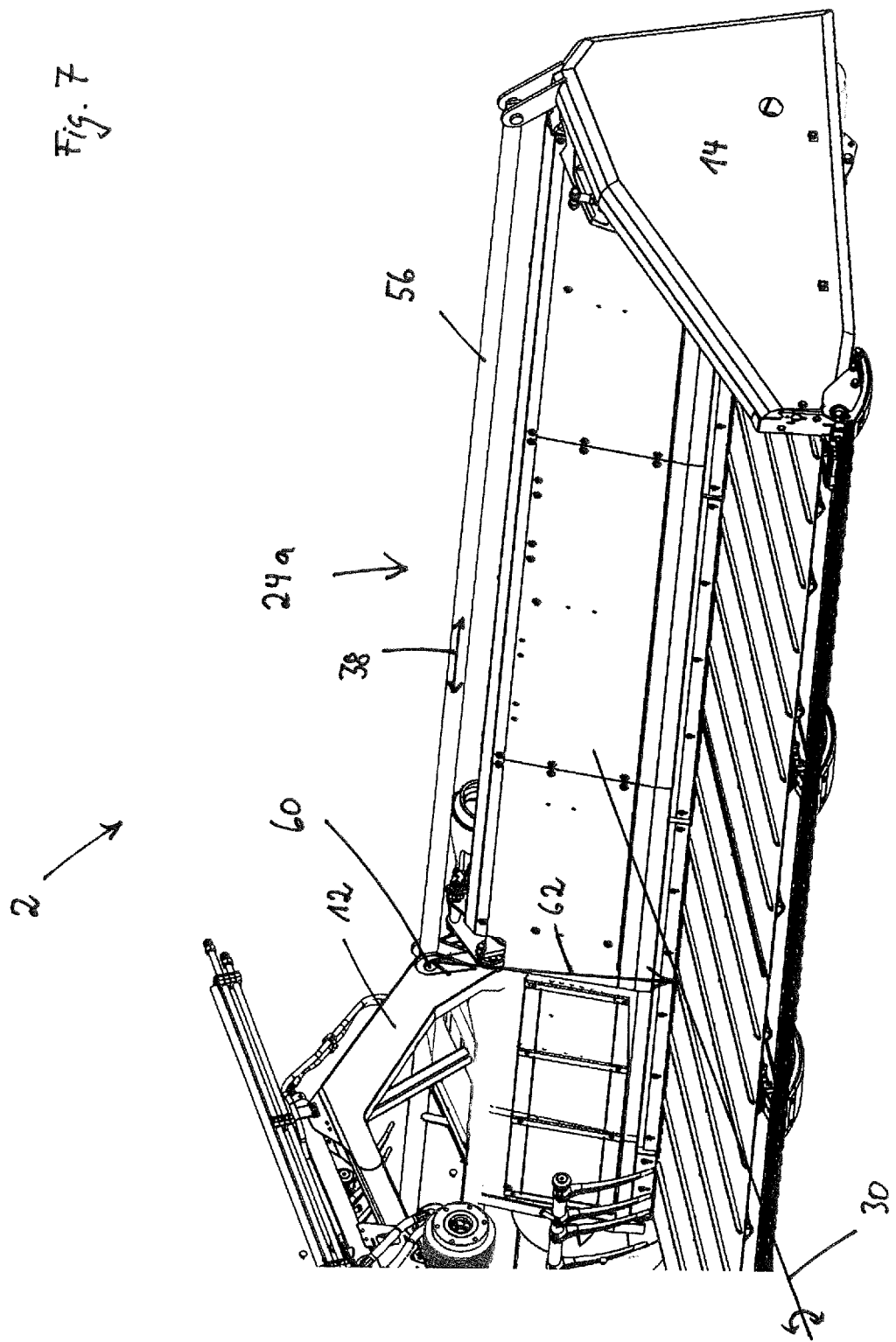

CUTTING UNIT HAVING MOVABLE SIDEWALLS

BACKGROUND OF THE INVENTION

The present invention concerns a cutting unit for attachment to a harvesting machine with a frame extending at least substantially across the working width of the cutting unit and assembled of a plurality of frame parts that each extended across a partial working width and are connected in an articulated fashion to each other about an axis extending at least approximately in working direction of the cutting unit; cutting elements arranged at the front side of the cutting unit and connected to the frame; conveying surfaces and conveying elements for conveying the cut crop from the cutting elements to a discharge location, of which at least individual conveying elements spaced apart from the conveying surface in vertical direction are held at a shaft that extends transversely to the working direction of the cutting unit across at least a partial working width of the cutting unit; and sidewalls having associated therewith stalk dividers that delimit the working width of the cutting unit.

When in this description "front" and "rear" are mentioned, these terms are always used in relation to the working direction of the cutting unit. The working direction is the direction in which the cutting unit is moved in order to cut the crop.

The publication DE 10 2011 116 341 A1 discloses a cutting unit that is assembled of a plurality of frame parts that each extend across a partial working width and that are connected to each other in an articulated fashion about an axis extending at least approximately in working direction of the cutting unit. In the embodiment illustrated in this publication, a central frame part is disclosed that is connected in an articulated fashion to two lateral frame parts. The conveying surfaces of a draper head disclosed in this publication are formed by conveying belts driven in circulation that convey the cut crop from the respective cutting point at the cutter bar as cutting element to a central and rearwardly arranged discharge location. In this manner, the conveying belts form at the same time conveying elements, and the conveying surface and the conveying elements are located in an identical plane.

However, it is also possible to configure the conveying surface of cutting units to not be active, as with a belt conveyor in case of draper heads, but also to be passive with a cutting unit trough with a sheet metal bottom across which the crop is conveyed by means of separate conveying elements. The conveying elements that are used in these cutting units with rigid sheet metal bottom can be, for example, rotatingly driven screw conveyors that comprise augers that are held at a shaft that extends transversely to the working direction of the cutting unit across at least a partial working width of the cutting unit and, when they are rotated, the crop is entrained by the augers. Also, it is possible in case of draper heads to arranged above the conveying belts additional screw conveyors. The screw conveyors can serve to convey crop parallel to the conveying belts. A screw conveyor can however also serve to convey, as a pull-in screw, crop that has collected in its action range in the direction toward the discharge location wherein the screw conveyor then can also convey crop transversely to the conveying direction of a central conveying belt and opposite to the working direction of the cutting unit. Screw conveyors are regularly spaced apart in vertical direction from the conveying surface. Screw conveyors can be designed additionally as rotation conveyors in order to convey crop to the rear to the discharge location in that they are provided with controlled fingers, or separate rotation conveyors are provided that serve only the purpose of conveying by means of followers crop that has collected upstream of the discharge location to the rear into the discharge location.

As a further conveying element, cutting units are provided with reels that extend transversely to the working direction of the cutting unit. The reels are driven in rotation and, during the harvesting work, dip with the reel tines held on a transverse rod from above in a downwardly oriented movement and, depending on the reel position in horizontal direction, in front of or behind the cutter bar into the standing crop in order to support the crop during the cut and place it onto the conveying surface after the cut. The reels are held at height-adjustable reel support arms that are held by a torsion shaft, extending transversely to the working direction of the cutting unit across at least a partial working width of the cutting unit, and are connected by the torsion shaft to the frame. The height adjustment of the reel is realized by a rotation of the torsion shaft.

In cutting units that are assembled of a plurality of frame parts that are each extending across a partial working width and that are connected to each other in an articulated fashion about an axis extending approximately in working direction of the cutting unit, there is the problem that, upon pivot movements of the frame parts relative to each other, length differences at the lateral outer ends result between the outer ends of the conveying surfaces, that are located at least approximately at the same vertical height as the pivot axes, and the outer ends of the conveying elements, that are held spaced apart in vertical direction from the conveying surfaces and thus also from the pivot axes at a shaft that extends transversely to the working direction of the cutting unit across at least a partial working width of the cutting unit. The shafts can be held in a plain bearing that permits a relative movement of the shaft relative to the frame in axial direction of the shaft in order to be able to compensate length differences upon pivot movements of the frame parts. The lengths of the shafts holding the conveying elements should then however be dimensioned in such a way and the conveying elements with their envelope circles be arranged on the shaft in such a way that, in case of extreme pivot positions of the frame parts relative to each other, they do not collide with the sidewalls of the cutting unit. In case of less extreme pivot positions of the frame parts relative to each other, the shafts with the conveying elements attached thereto then are however too long or too short, depending on the actual geometries, for bridging the then existing distance between the outer end of the envelope circle of the conveying elements and the sidewall of the cutting unit without colliding with the sidewall upon pivot movements. Depending on the pivot position, differently wide free spaces are then provided thereat in which the conveying elements held at the shafts are not effective for less extreme pivot positions. Since the extreme pivot positions occur only in a minimal portion of the entire time of use of a cutting unit, this means that the conveying elements in the region of a free space during the predominant time of use of the cutting unit are not effective.

The free spaces in which conveying elements are not effective are in particular disadvantageous in regard to the reel function. When the crop stalks during cutting are not supported by the reel tines and thrown onto the conveying surface, they can drop in front of the cutter bar after the cut where they are no longer picked up by the cutting unit. Also, cut crop can back up in the region of the free space that, as a ball of material, is then not conveyed away and pushes crop still to be cut to the side and downwardly before it can be cut by the cutter bar. This also causes crop losses. When considering that the free spaces depending on the pivot angle and the working widths of the frame parts on one side of the cutting unit alone can amount to a width of 30 cm, for a working width of the cutting unit of a total of 10 m, for example, partial widths of 60 cm and thus 6% can result in which the reel function is not available in case of less extreme pivot positions of the frame parts. In case of other conveying elements than the reel, for example, in case of the screw conveyors, a partial working width of 6% in which the screw conveyors are not effective also has a disadvantageous effect on the crop flow and material losses of the cutting unit.

It is the object of the present invention to reduce the free spaces at the outer ends of conveying elements in which the conveying elements are ineffective, depending on the pivot position of the frame parts relative to each other.

SUMMARY OF THE INVENTION

The object is solved for a cutting unit according to the invention in that the sidewalls are movably configured transversely to the working direction of the cutting unit and to the frame or the respective associated frame parts. Due to the movably configured sidewalls, the free spaces between the outer ends of conveying elements and the adjoining sidewalls can be kept smaller as it would be possible for sidewalls that are rigidly connected to a frame or corresponding frame part. The sidewalls are pivoted in this context preferably such that, in the different pivot positions that a frame part can assume, they are held close to the outer ends of the conveying elements without colliding with them.

According to an embodiment of the invention, the at least one sidewall with its top part is connected by a coupling rod to a support point that is positioned in an inwardly positioned region of the cutting unit, the support point is arranged at a distance in vertical direction to the axis, and the sidewall is movably connected with its bottom part to the frame, or the top part of the sidewall is connected to the bottom part of the sidewall by a hinge, a ball joint and/or a connecting body of an elastomeric material that forms a bending axis in the sidewall.

By the connection of the sidewall to the support point positioned in the inwardly positioned region of the cutting unit by means of a coupling rod and the movable connection of the sidewall to the frame in its bottom part, it remains in a tight spatial connection to the outer ends of the shafts at which the conveying elements are held. The pivot position of the sidewall to the frame part is determined by a four-bar linkage that is determined by the axis about which the frame part pivots in relation to another frame part, the connecting point where the sidewall is connected to this frame element, the articulation point where the sidewall is connected to the coupling rod, and the articulation point where the coupling rod is connected to the support point. The radii at which the frame part pivots about the axis and the coupling rod about the support point are fixed. Variable is the relative position that the frame part and the coupling rod connected to each other by the sidewall assume relative to each other due to the pivot movement. Changes in the relative position of these components relative to each other result in the four-bar linkage mandatorily in a change of the pivot position of the sidewall in relation to the frame part. The greater the distance of the support point to the axis about which the frame part pivots, the more pronounced the pivoting action. Thus, upon changes of the pivot position of the frame part relative to conveying elements that are held at a shaft and spaced apart in vertical direction to the conveying surface, the sidewall spatially aligns itself in particular in its top part to the position of the outer end of the coupling rod relative to the frame part and does not follow rigidly the positional changes of the frame part upon pivot movements. Since the sidewall is connected by means of the coupling rod to the support point that is positioned at the inwardly positioned region of the cutting unit, the intermediate spaces between the sidewall and the conveying elements held at a shaft cannot change, or at most slightly change, upon pivot movements of the frame parts to each other and resulting changes of the spatial position of components relative to each other.

Due to the coupling of the sidewall to the coupling rod, even the bottom part of the sidewall is held closer to the envelope circle of the conveying elements, depending on in which manner the bottom part of the sidewall is connected to the frame part. Due to the coupling of the side part with the coupling rod, the sidewall, upon a change of the pivot angle of the frame parts to each other, is tilted in a direction transversely to the working direction of the cutting unit about an axis pointing in working direction so that the sidewall, depending on the pivot position of a correlated frame part, is held at a different setting angle relative to the neighboring conveying surface of the cutting unit. In this way, the free space between the envelope circle of the conveying elements and the sidewall is kept as small as possible independent of the pivot position of the correlated frame part.

The inwardly positioned region of the cutting unit where the support point is located is to be understood as a region that—viewed across the working width—is positioned remote from the lateral ends of the cutting unit toward the center of the cutting unit in inward direction. In order to adapt the pivot movements of the sidewall to the concrete movement need that is required for keeping the free space in all pivot positions of the frame part as small as possible, the support point for the coupling rod can be positioned, viewed across the working width of the cutting unit, at least approximately or precisely in the region in which also the axis is located about which neighboring frame parts pivot relative to each other, however at a vertical distance thereto. In case of the four-bar linkage, formed by a frame part, the coupling rod, the sidewall, the axis about which a frame part pivots, and the support point, at least approximately a quadrangle results in the normal position in which the sidewall is standing upright in the normal position and tilts with the top end inwardly or outwardly, depending on pivot direction of the frame part, when the frame part is pivoted.

The outer ends of the reel and/or other conveying elements remain thus in an essentially same spatial position to the sidewall. Due to the reduction of the free space, the conveying efficiency of the reel and/or of the other conveying elements is increased.

When the top part of the sidewall is connected to the bottom part of the sidewall by a hinge, a ball joint and/or a connection body of an elastomeric material that forms a bending axis in the sidewall, the lateral movement that is transmitted by the coupling rod to the sidewall can be compensated also by a bending movement of the top part of the sidewall along the bending axis through the sidewall in relation to the bottom part of the sidewall. The lower the bending axis is positioned, the smaller is the free space between the sidewall and a neighboring conveying element. The bending axis can thus be positioned also directly at the level of the conveying surface of the conveying elements or below. In this embodiment, the sidewall is thus no rigid component any more but, by a spatial displacement of the top part of the sidewall, can compensate the relative lateral movement of the coupling rod in axial direction in relation to the cutting unit part. The bottom part of the sidewall can then be connected fixedly to the side part. A sidewall that does not have a precisely defined bending axis but is embodied elastic and flexible, for example, by use of a bending-elastic material so that due to its material and its dimensions a flexible adaptation of the sidewall is enabled upon relative lateral displacements of the coupling rod in relation to the frame part, is to be viewed as technically equivalent.

In summary, there are thus two possibilities for compensating the length offset between a coupling rod and the frame part upon pivot movements of the frame part by a pivoting action of the sidewall: Either, the sidewall as a whole is moved in order to compensate the length offset at least partially or the sidewall is divided and the length offset is compensated by the movable part of the sidewall.

The stalk divider that is correlated with a sidewall serves to divide with its tip, in front of the cutter bar, the standing stalk crop to be harvested upon travel of the harvesting machine into the standing crop into a first part, that subsequently is cut directly by the cutter bar and conveyed away, and into a second part that is passed by the cutting unit and that is actually not subjected to harvesting work until the harvesting machine approaches the second part that has been separated by the stalk divider such that it is now harvested as the first part. In that the stalk divider specifically defines which crop in the edge region of the travel path still belongs to the harvesting path of this harvesting machine or to one of the next harvesting machines, impacts of the cutting unit on individual plant stalks with possibly resulting grain losses are avoided.

According to an embodiment of the invention, at least individual conveying elements that are arranged spaced apart in vertical direction from the conveying surface are held at a shaft that is extending transversely to the working direction of the cutting unit across at least a partial working width of the cutting unit and that is held so as to be moveable in axial direction in a plain bearing supported on the frame or the frame parts, and this shaft is used as a coupling rod. In this solution, it is not necessary to use a separate coupling rod as drive for a pivot movement but a shaft of an existing conveying element can be used in order to pivot the sidewall. In such a solution, for example, a ball joint, a gear unit or a universal joint, by means of which a part of the shaft that is pointing to the outer edge of the cutting unit is held and supported, can form the support point for the shaft that is a component of the four-bar linkage.

According to an embodiment of the invention, a torsion shaft of a reel support arm, a shaft of a screw conveyor and/or a drive shaft are used as a coupling rod. The torsion shaft of a reel support arm, a drive shaft and/or a shaft of a screw conveyor are often present in a cutting unit in order to convey the crop. These shafts can be configured with an easy modification or suitable attachment parts in such a way that they can pivot the sidewall as a further function. When no screw conveyor or no suitably oriented drive shaft is present at the cutting unit, the sidewall by means of the torsion shaft alone can be tilted in a desired direction, or correspondingly only with the drive shaft or the shaft of a screw conveyor. When the torsion shaft is positioned inconveniently relative to the sidewall and a screw conveyor or a matchingly oriented and supported drive shaft is present that is positioned more conveniently relative to the sidewall, the sidewall can also be pivoted by a connection to this shaft alone. Finally, the sidewall can be connected at the same time to the torsion shaft, a drive shaft, and the shaft of a screw conveyor.

According to an embodiment of the invention, the coupling element is designed to not be length-elastic in connection direction. By means of a connection that is not length-elastic, positional changes between the frame part and the torsion shaft of a reel support arm and/or the shaft of a screw conveyor are transmitted immediately by a pulling force or pushing force to the sidewall in that the coupling element adjusts the sidewall into an angle position relative to the conveying plane that matches the actual pivot position of the frame parts relative to each other.

According to an embodiment of the invention, the coupling element is connected by a first joint to the torsion shaft of a reel support arm and/or to the shaft of a screw conveyor and by a second joint to the sidewall. By means of the two joints, angle changes between the coupling element and the torsion shaft and/or the shaft of a screw conveyor can be compensated which result from a change of the relative position of these components in relation to the frame part.

According to an embodiment of the invention, the coupling element is connected to the torsion shaft of a reel support arm and/or the shaft of a screw conveyor by a bearing that permits rotational movements of the torsion shaft and/or of the shaft of a screw conveyor. Due to the bearing that permits rotational movements, the coupling element is decoupled from loads of those kinds of rotational movements that the torsion shaft and/or the shaft of the screw conveyor must perform mandatorily regarding function in order to adjust the reel height or convey crop. The bearing can be, for example, a plain bearing or ball bearing. The bearing is however designed such that it transmits to the coupling element the pulling forces and pushing forces, which are to be transmitted from the torsion shaft and/or from the shaft of the screw conveyor in axial direction of the torsion shaft and/or of the shaft of the screw conveyor to the coupling element.

According to an embodiment of the invention, the sidewall is connected by a hinge, a ball joint and/or a connection body of an elastomeric material to the frame part. When the setting angle of the sidewall in relation to the frame part is to be changeable by means of the coupling element, it is required to connect the sidewall to the frame part in such a way that the connection of the sidewall to the frame part enables indeed such a movement. A corresponding movability is provided by a hinge, a ball joint and/or a connection body of an elastomeric material.

According to an embodiment of the invention, the torsion shaft is connected with at least two reel support arms by means of which the height position of the reel supported thereon is adjustable, the torsion shaft is at least supported twofold at a distance relative to each other, and the coupling element engages the torsion shaft at the end outside of the intermediate space between the two bearings. In this embodiment, the torsion shaft together with the reel support arms, the reel, the support of the torsion shaft, and the connection of the torsion shaft to the sidewall forms a common function component group that is easily adjustable by a drive and realizes in an inexpensive manner with a few components several functions in one component group. When the connection of the torsion shaft to the sidewall by means of the coupling element is positioned outside of the intermediate space between the two bearings, it is also possible to dispense with a complex force transmission paths.

According to an embodiment of the invention, a mechanical end stop is formed at the torsion shaft in at least one movement direction. Due to the end stop, the movement of the torsion shaft and/or of the shaft of the screw conveyor is limited in one direction. Extreme length displacements that could lead to functional impairments or even damage on components are thereby avoided. Of course, also a second end stop can be present with which a movement in the opposite axial direction of the torsion shaft is prevented.

According to an embodiment of the invention, the support point can be moved by an actuator and/or the coupling rod is length-changeable by an actuator. By means of the actuator, the pivot movement of the sidewall can be affected still. It is thus possible to adjust the sidewall to a certain angle position that is desirable in a harvesting situation, or a control action or regulation action is used that, as a function of the pivot position of the corresponding frame part, changes the position of the support point and/or the length of the coupling rod in order to keep the free space between the sidewall and a neighboring conveying element as small as possible.

According to an embodiment of the invention, between at least the frame or a frame part and the correlated sidewall an actuator motor is present with which the sidewall is movable transversely to the working direction of the cutting unit and to the frame or to the respective frame part. The actuator motor can be a motor that is driven hydraulically, electrically, pneumatically or in other ways. The actuator is fixedly mounted on the frame or the frame part and connected to the sidewall such that it moves with its adjustment movements the sidewall transversely to the working direction of the cutting unit and to the respectively associated frame part. Other mechanical coupling elements between a sidewall and other components of the cutting unit can be dispensed with in this solution. The actuator can adjust the pivot position of the corresponding sidewall in steps or continuously. As already explained above, the sidewall can be embodied rigidly and can be connected in an articulated fashion to the frame or frame part and is moved as a whole by the actuator into different pivot positions, or the sidewall comprises a bending axis about which only the top part of the sidewall is pivoted by the actuator.

According to an embodiment of the invention, an electronic control action or regulation action is connected to the actuator that operates the actuator. The actuator can be provided with a sequence control action with which the actuator follows the pivot movements that the frame part provided with the sidewall carries out in relation to a neighboring frame part. The pivot position can be monitored by sensors that transmit their sensor data to the control action or regulation action. As sensors, however proximity sensors can be connected also to the control action or regulation action that measure the distance of the sidewall to neighboring conveying elements and transmit this measured signal to the control action or regulation action. The control action or regulation action is provided with a suitable software in order to evaluate the incoming sensor values and derive therefrom adjustment signals with which the actuator is moved. Other control actions or regulation actions for a suitable adjustment of the actuator are possible.

Further features of the invention result from the claims, the Figures, and the Figure description. All features and feature combinations mentioned above in the description as well as the features and feature combinations disclosed in the following in the Figure description and/or illustrated in the Figures alone are not only usable in the respectively disclosed combination but also in other combinations, or however individually.

BRIEF DESCRIPTION OF THE DRAWINGS

The invention will now be explained in more detail with the aid of a preferred embodiment as well as with reference to the attached drawings.

It is shown in:

FIG. 3: an enlarged detail view of an outer end of the cutting unit with a sidewall;

FIGS. 4*a*-4*c*: a view of the connecting zone between the sidewall and the frame part with a different pivot position of the sidewall, respectively;

FIG. 7: a view of a cutting unit with a coupling rod.

DESCRIPTION OF PREFERRED EMBODIMENTS

Figure 1:
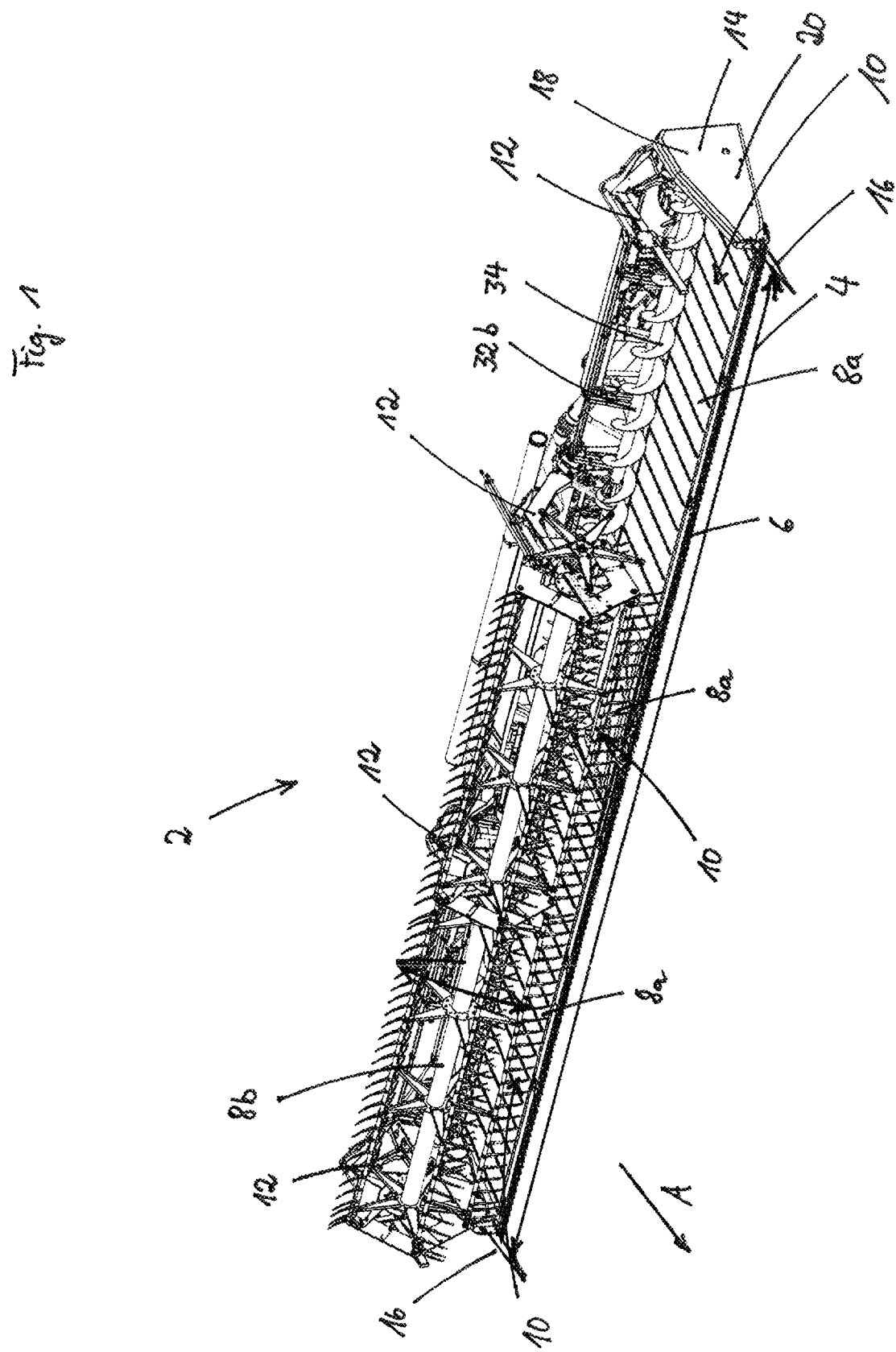
FIG. 1: a front view of a cutting unit at a slant.

A cutting unit 2 is shown in FIG. 1 in a front view at a slant. The cutting unit 2 comprises a working width 4. At the front side of the cutting unit 2, there is a cutter bar as a cutting element 6 that is driven in oscillation and comprises a larger number of knife blades arranged adjacent to each other.

Behind the cutting element 6, two outer belt conveyors 8*a* are provided that convey, transversely to the working direction A of the cutting unit, the cut crop toward the center while in the center of the cutting unit 2 a further belt conveyor 8*a* is provided that conveys the received crop to the rear in a direction opposite to the working direction A.

Above the belt conveyors 8*a* as a first example of a conveying element 8, there is a reel 8*b* as a second example of a conveying element 8 that is driven in rotation and throws the cut crop after the cut onto the belt conveyors 8*a*. In the example, the belt conveyors 8*a* form a conveying surface 10 on which the cut crop is conveyed away. In cutting units other than a draper head, the conveying surface 10 can also be designed as a simple sheet metal bottom that comprises no drive at all. As a further conveying element 8, a screw conveyor 34 is illustrated that is arranged behind the belt conveyors 8*a* and rotates with the shaft 32*b*.

The reel 8*b* is held at reel support arms 12 that are configured to be height-adjustable. The height adjustment of the reel 8*b* is indicated by a double arrow.

The lateral outer ends of the cutting unit 2 are covered by sidewalls 14 that are each provided with a stalk divider 16. The stalk divider 16 projects forwardly past the sidewalls 14 and the cutting element 6 and divides the crop standing on the field in front of the cutting unit 10 into a first part that is cut by the cutting unit 2 and a second part that remains standing on the field uncut as it is being passed. The sidewall 14 comprises a top part 18 as well as a bottom part 20.

Figure 2:
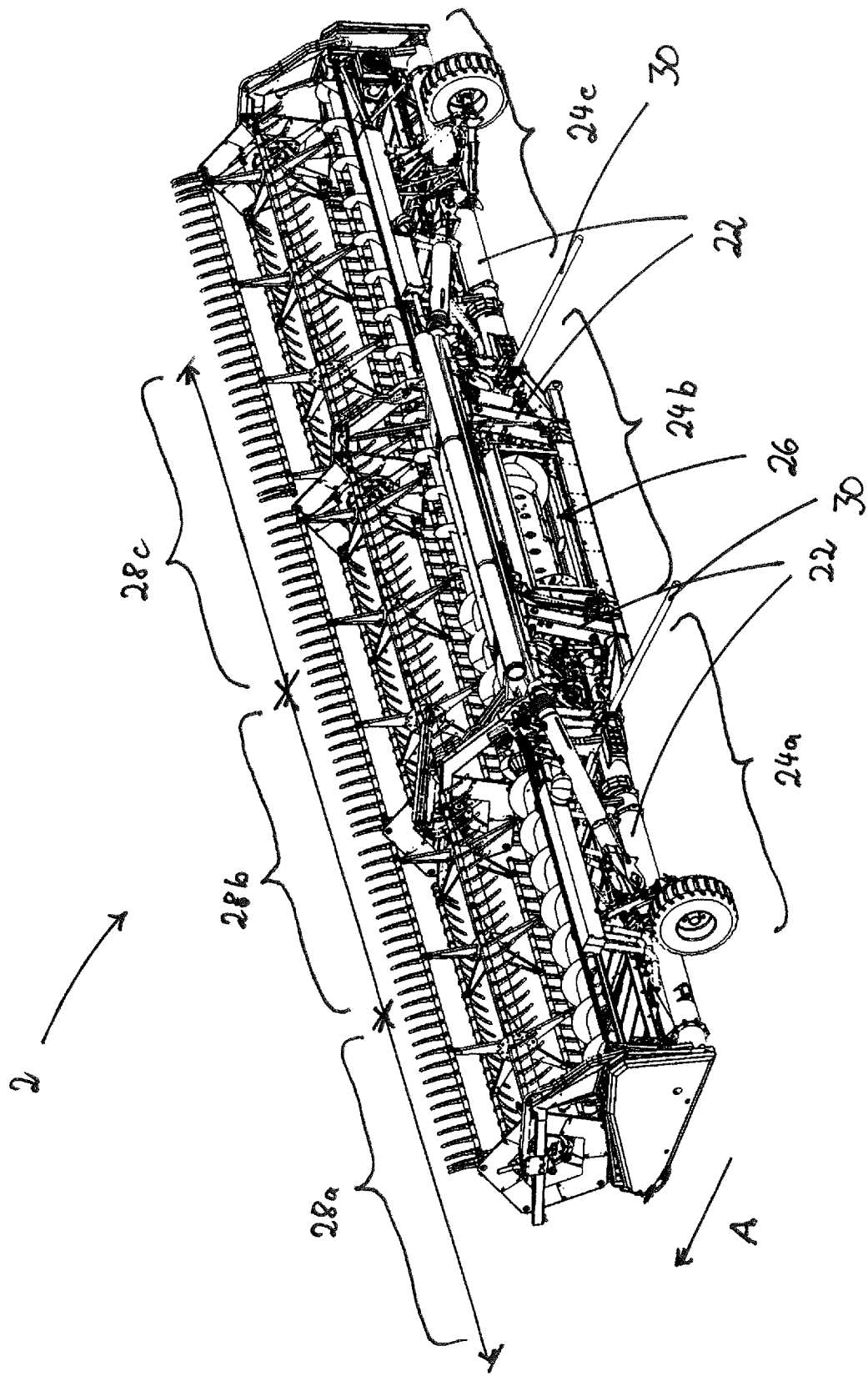
FIG. 2: a rear view of a cutting unit at a slant.

FIG. 2 shows a rear view of a cutting unit 2 at a slant. In this view, the frame 22 can be seen which in the embodiment is comprised of three frame parts 24*a*, 24*b*, and 24*c*. In deviation from the embodiment, the frame 22 instead of being formed by the frame parts 24*a*, 24*b*, 24*c* can also be formed of a single rigid frame 22 that extends across the entire working width 4. At the central frame part 24*b*, the discharge location 26 is provided in the rear wall through which the crop cut and conveyed by the cutting unit 2 is discharged to a slanted conveyor channel of a harvesting machine that is not illustrated here. The frame parts 24*a*, 24b, and 24c comprise each a correlated partial working width 28a, 28b, and 28c. The outer frame parts 24a, 24c are connected to the central frame part 24b in an articulated fashion in relation to the central frame part 24b about an axis 30 which is oriented at least approximately in the working direction A of the cutting unit 2. When the cutting unit 2 during harvesting is resting with its bottom side on the ground and the ground is uneven, the outer frame parts 24a, 24c upon forward travel of the harvesting machine can yield upwardly or downwardly with their free end by a corresponding pivot movement about the axis 30 when the ground drops or rises in the region of its partial working width 28a, 28c. In the same manner, the central frame part 24b can yield upwardly or downwardly when the ground there rises or drops, wherein then, depending on the ground contour, the outer frame parts 24a, 24c with their free ends pivot upwardly or downwardly relative to the central frame part 24b or remain at a level with the central frame part 24b.

In FIG. 3, an enlarged detail view of an outer end of the cutting unit 2 with a sidewall 14 is illustrated. The reel support arm 12 at which the reel 8b is supported is fastened rotatably fixed to the torsion shaft 32a for the reel 8b. In order to adjust the reel 8b in its height, the torsion shaft 32a is rotated about its longitudinal axis as indicated by the double arrow. Upon a pivot movement of the frame part 24a in vertical direction, as also indicated by a double arrow, the spatial position of the torsion shaft 32a is moved in axial direction relative to the frame part 24a, as indicated by the double arrow 38. Since the torsion shaft 32a is supported in the plain bearing 36, the torsion shaft 32a can move in the axial direction 38 in relation to the frame part 24a.

The torsion shaft 32a is connected in connection direction 40 by a coupling element 42 to the sidewall 14. The coupling element 42 is connected at the top part 18 of the sidewall 14 to the latter. The bottom part 20 of the sidewall 14 is connected to the frame part 24a. In the view illustrated in FIG. 3, it can be seen that, upon a push movement or pull movement of the torsion shaft 32a in the axial direction 38 relative to the frame part 24a, the top part 18 of the sidewall 14 is also moved in the axial direction 38 while the bottom part 20 of the sidewall 14, without a corresponding movement impulse, remains in an approximately same spatial position relative to the frame part 24a. This movement of the sidewall 14 causes a kind of tilting movement about an axis which is at least approximately oriented in working direction A of the cutting unit 2.

In FIGS. 4a-4c, a view of the connection zone between the sidewall 14 and the frame part 24a is illustrated, wherein the sidewall 14 in FIG. 4a is arranged in a central neutral position in which it is upright in vertical direction. In FIG. 4b, a position of the sidewall 14 is illustrated in which it is tilted outwardly with its top end. Such a position results when the outer end of the frame part 24a is pivoted in upward direction. In FIG. 4c, a position of the sidewall 14 is illustrated in which it is slanted inwardly with its upper end. Such a position results when the outer end of the frame part 24a is pivoted downwardly. When comparing FIGS. 4a-4c, it is apparent that the free space 58 between the sidewall 14 and the outer end of the reel 8b, independent of the pivot position of the sidewall 14, remains approximately the same.

In the views illustrated in FIGS. 4a-4c, it can be seen that the coupling element 42 is connected by a first joint 44 to the torsion shaft 32a and by a second joint 46 to the sidewall 14. The height differences between the torsion shaft 32a and the sidewall 14 resulting from the movement in axial direction 38 can be compensated by means of the two joints 44, 46.

The torsion shaft 32a is connected to the coupling element 42 by a bearing 48 that enables rotational movements of the torsion shaft 32a. The bearing 48 is connected rotatably fixed to the torsion shaft 32a and rotatably connected to the coupling element 42. The bearing 48 is designed such that it can transmit nonetheless pulling forces and pushing forces in axial direction 38 from the torsion shaft 32a to the sidewall 14.

The afore described connection of the torsion shaft 32a to the coupling element 42 by means of the bearing 48 can be realized in deviation from the embodiment in the same manner also for the shaft 32b of a screw conveyor 34 when it is connected to the sidewall 14 for pivoting the latter.

Figure 5B:
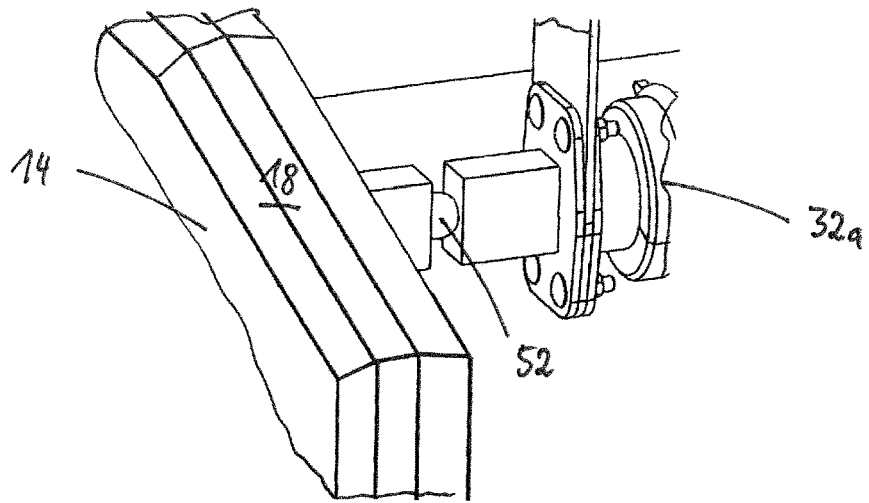
FIGS. 5*a*-5*c*: different embodiments of a connection of the sidewall to the torsion shaft.
Figure 5A:
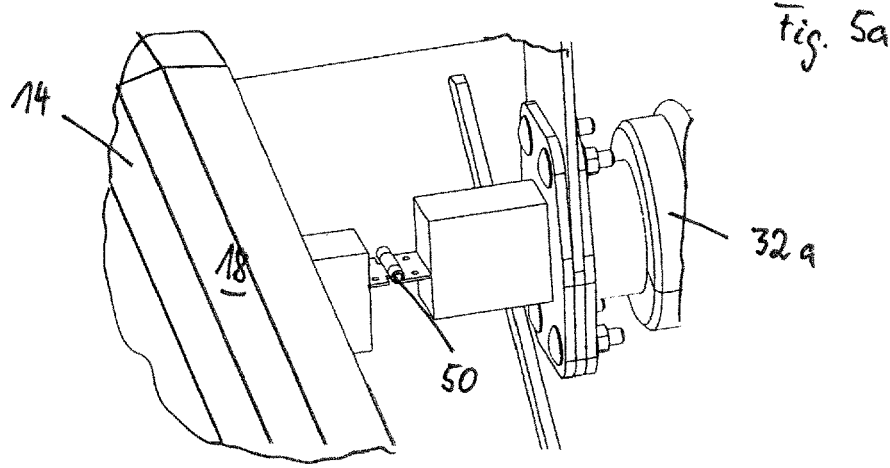
Figure 5C:
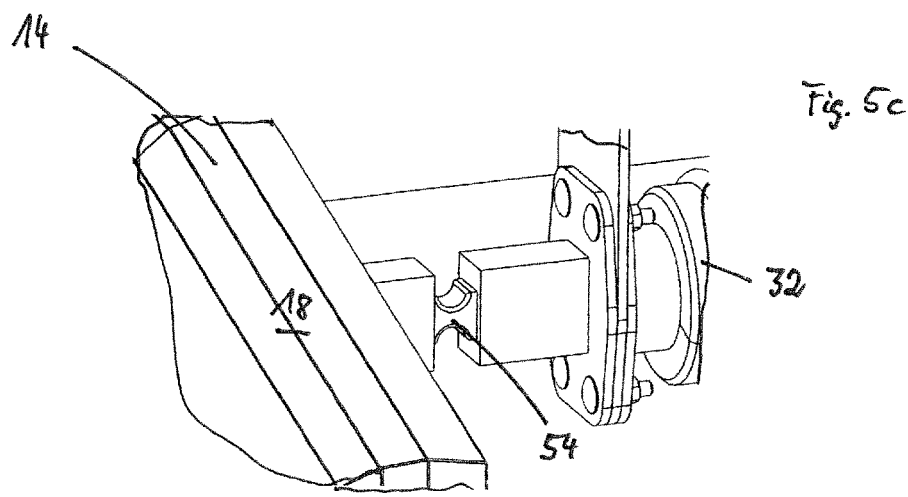

In the following FIGS. 5a, 5b, and 5c, different examples are illustrated how the sidewall 14 in the top part 18 can be connected to the torsion shaft 32a. In FIG. 5a, as a connection means a hinge 50 is illustrated, in FIG. 5b a ball joint 52, and in FIG. 5c a connection body 54 that is produced of an elastomeric material.

Figure 6C:
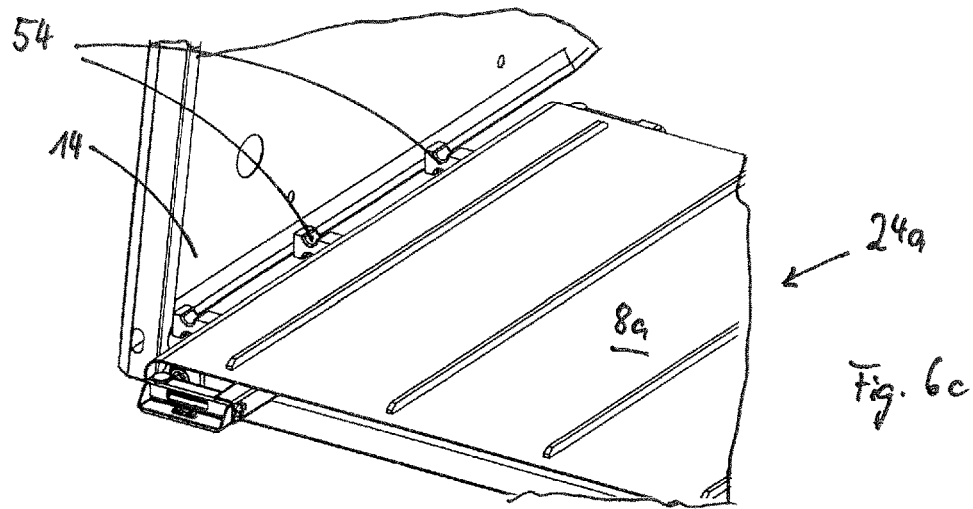
FIGS. 6*a*-6*c*: different embodiments of a connection of the sidewall to the frame part.
Figure 6A:
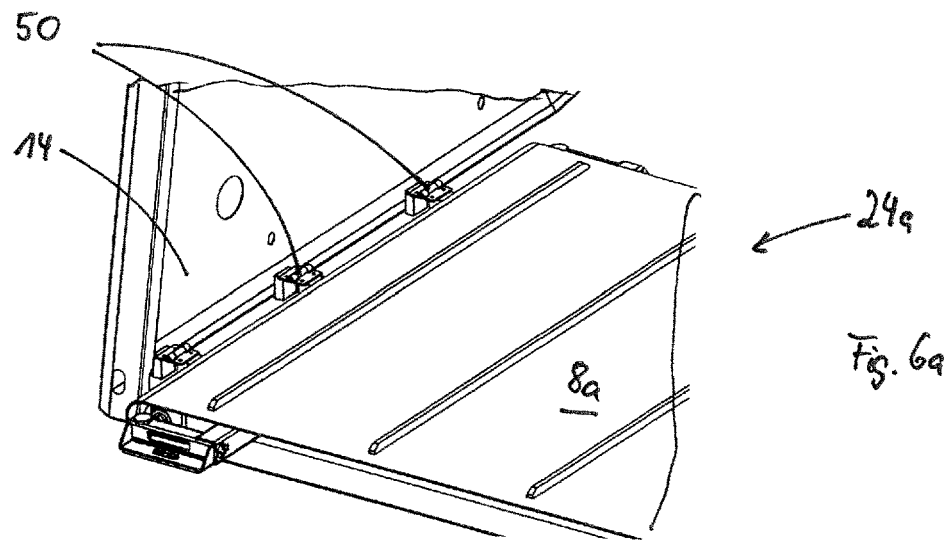
Figure 6B:
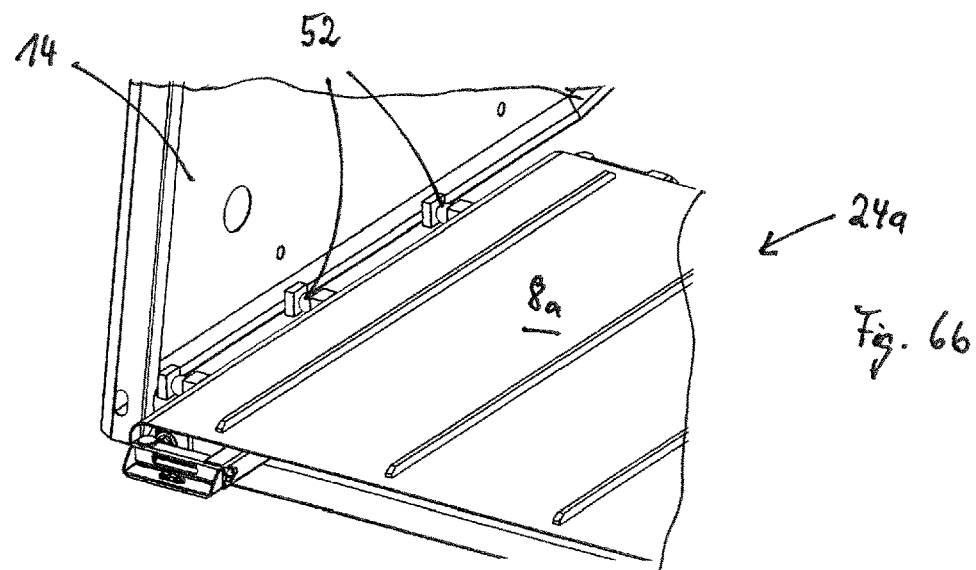

In FIGS. 6a, 6b, and 6c, different examples are illustrated how the sidewall 14 can be connected to the frame part 24a in the bottom part 20. In FIG. 6a, as a connecting means a hinge 50 is illustrated, in FIG. 6b a ball joint 52, and in FIG. 6c a connection body 54 that is produced of an elastomeric material.

In FIG. 7, an embodiment with a view of a cutting unit 2 is illustrated in which the relative position change of a coupling rod 56 in the axial direction 38 in relation to the frame part 24a upon a pivot movement with its free end is transmitted with the coupling rod 56 to the sidewall 14. The coupling rod 56 is connected by means of the support point 60 to a component that supports the coupling rod in the direction of the axial direction 38. Since the support point 60 comprises a distance 62 in vertical direction relative to the axis 30, the spatial position change of the coupling rod 56 relative to the frame of the frame part 24 results in a four-bar linkage.

The invention is not limited to the afore described embodiments. A person of skill in the art will have no difficulties to modify the embodiments in a manner appearing suitable to him in order to adapt them to a concrete application situation.

LIST OF REFERENCE NUMBERS 2 cutting unit
4 working width
6 cutting element
8a belt conveyor
8b reel
10 conveying surface
12 reel support arm
14 sidewall
16 stalk divider
18 top part
20 bottom part
22 frame
24 frame part
26 discharge location
28 partial working width
30 axis
32a torsion shaft
32b screw conveyor shaft
34 screw conveyor
36 plain bearing
38 axial direction
40 connection device 42 coupling element
44 first joint
46 second joint
48 bearing
50 hinge
52 ball joint
54 elastic connection body
56 coupling rod
58 intermediate space
60 support point

What is claimed is:

1. A cutting unit (2) for attachment to a harvesting machine, the cutting unit (2) comprising:
   a frame (22) extending at least substantially across a working width (4) of the cutting unit (2), the frame (22) assembled of a plurality of frame parts (24a, 24b, 24c) that extend each across a portion of the working width (4) of the cutting unit (2) and are connected to each other in an articulated fashion about an axis (30) extending at least approximately in a working direction (A) of the cutting unit (2);
   cutting elements (6) arranged at a front side of the cutting unit (2) and connected to the frame (22);
   conveying surfaces (10) and conveying elements (8) configured to convey a cut crop away from the cutting elements (6) to a discharge location (26), wherein the conveying elements (8) include individual conveying elements (8b, 34) arranged in a vertical direction spaced apart from the conveying surface (10) and held at a shaft (8b, 32b) that extends transversely to the working direction (A) of the cutting unit (2) across at least a portion of the working width (4) of the cutting unit (2), wherein the shaft (8b, 32b) is supported by support arms (12); and
   sidewalls (14) connected with a bottom part (20) thereof to the frame (22) and covering lateral outer ends of the cutting unit (2), wherein the sidewalls (14) have correlated therewith stalk dividers (16) that delimit the working width (4) of the cutting unit (2), wherein the sidewalls (14) are configured to move relative to the respective correlated frame parts (24a, 24c) in a direction transverse to the working direction (A) of the cutting unit (2).

2. The cutting unit (2) according to claim 1, wherein at least one of the sidewalls (14) is connected with a top part (18) thereof by a coupling rod (56) to a support point (60) positioned in an inwardly positioned region of the cutting unit (2), wherein the support point (60) is arranged at a distance (62) in a vertical direction relative to the axis (30), and the at least one of the sidewalls (14) is connected movably with the bottom part (20) to the frame (22), or the top part (18) of the at least one of the sidewalls (14) is connected to the bottom part of the at least one of the sidewalls (14) by a hinge (50), a ball joint (52) and/or a connection body (54) of an elastomeric material that forms a bending axis.

3. The cutting unit (2) according to claim 2, wherein the individual conveying elements (8b, 34) arranged spaced apart in the vertical direction from the conveying surface (10) are held at the shaft (32b) that extends transversely to the working direction of the cutting unit (2) across at least a portion of the working width (4) of the cutting unit (2), wherein the shaft (32b) is held moveably in an axial direction in a plain bearing supported on the frame (22) or the respective correlated frame parts (24a, 24c), and wherein the shaft (32b) is the coupling rod (56).

4. The cutting unit (2) according to claim 2, wherein the support arms (12) include a reel support arm (12) and wherein the coupling rod (56) is a torsion shaft (32a) of the reel support arm (12), a drive shaft and/or a shaft (32b) of a screw conveyor (34).

5. The cutting unit (2) according to claim 2, wherein the support arms (12) include a reel support arm (12), wherein the coupling rod (56) is a torsion shaft (32a) of the reel support arm (12) and is connected by a coupling element (42) to the at least one of the sidewalls (14), and the coupling element (42) is embodied to not be length-elastic in a connection direction (40).

6. The cutting unit (2) according to claim 4, wherein a coupling element (42) is connected by a first joint (44) to the torsion shaft (32a) of the reel support arm (12) and/or the shaft (32b) of the screw conveyor (34) and by a second joint (46) to the at least one of the sidewalls (14).

7. The cutting unit (2) according to claim 4, wherein a coupling element (42) is connected to the torsion shaft (32a) of the reel support arm (12) and/or the shaft (32b) of the screw conveyor (34) by a bearing (48) that enables rotational movements of the torsion shaft (32a) and/or of the shaft (32b) of the screw conveyor (34).

8. The cutting unit (2) according to claim 1, wherein at least one of the sidewalls (14) is connected to the respective correlated frame part (24a, 24c) by a hinge (50), a ball joint (52) and/or a connection body (54) of an elastomeric material.

9. The cutting unit (2) according to claim 2, wherein the support arms (12) include reel support arms (12), wherein the coupling rod (56) is a torsion shaft (32a) of the reel support arms (12) and is connected to at least two reel support arms (12) configured to adjust a height position of a reel (8b) supported thereby, wherein the torsion shaft (32a) is supported at least by two bearings at a distance from each other, and wherein a coupling element (42), connecting the torsion shaft (32a) to the at least one of the sidewalls (14), engages outside of the intermediate space between the two bearings at the torsion shaft (32a).

10. The cutting unit (2) according to claim 2, wherein the support arms (12) include a reel support arm (12), wherein the coupling rod (56) is a torsion shaft (32a) of the reel support arm (12) and at the torsion shaft (32a) a mechanical stop is provided in at least one movement direction.

11. The cutting unit (2) according to claim 2, wherein the support point (60) is movable by an actuator and/or the coupling rod (56) is length-changeable by an actuator.

12. The cutting unit (2) according to claim 1, wherein between the frame (22) or at least one respective correlated frame part (24a, 24c) and the correlated sidewall (14) an actuator motor is present, wherein the actuator motor is configured to move the correlated sidewall (14) transversely to the working direction (A) of the cutting unit (2) and to the frame (22) or the respective correlated frame part (24a, 24c).

13. The cutting unit (2) according to claim 12, wherein an electronic control action or regulation action that operates the actuator is connected to the actuator.

* * * * *